Jan. 26, 1965   M. E. ROBINSON   3,166,880
MOWER
Filed April 1, 1963   4 Sheets-Sheet 2
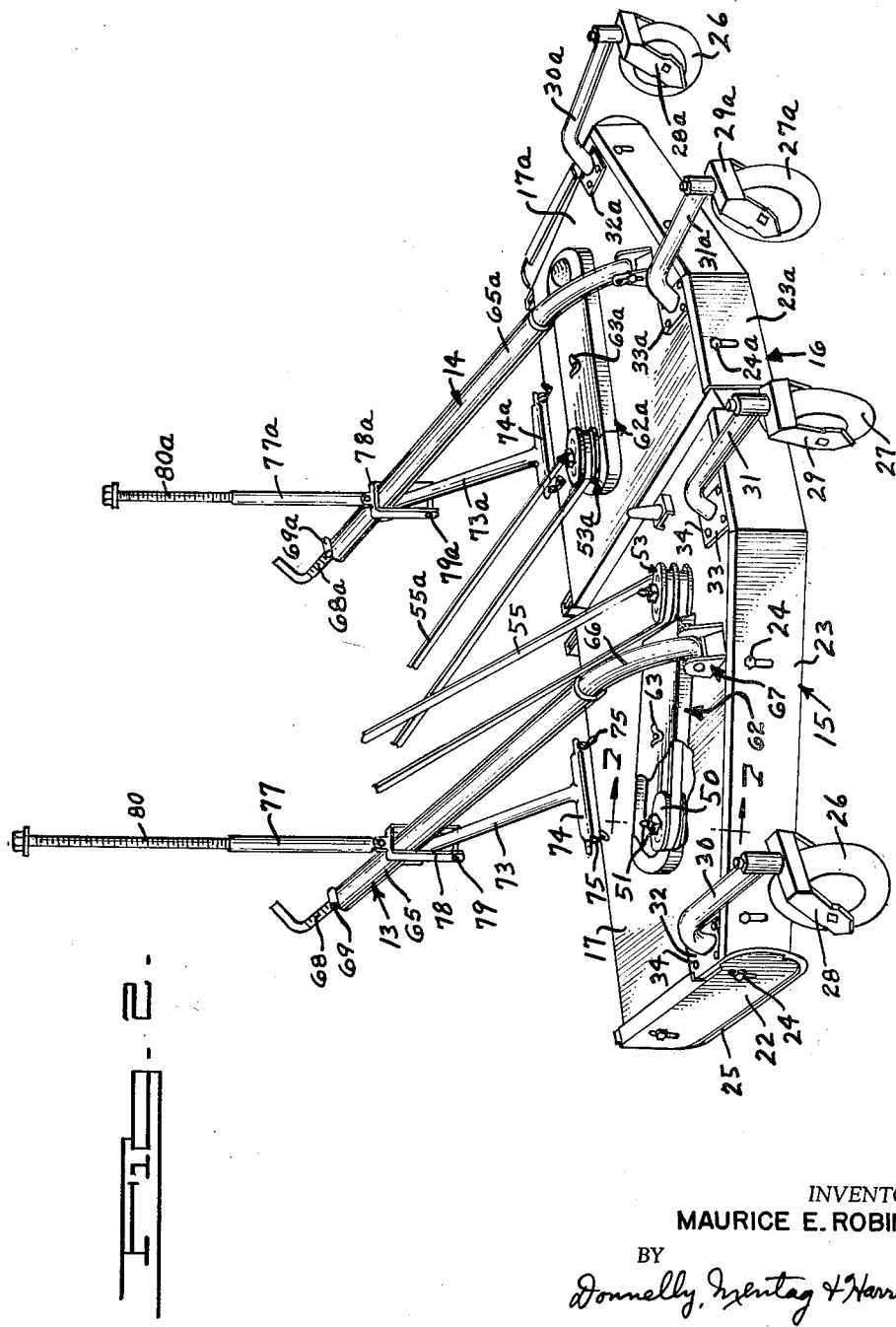
INVENTOR.
MAURICE E. ROBINSON
BY
Donnelly, Mentag & Harrington
ATTORNEYS Jan. 26, 1965
M. E. ROBINSON
3,166,880
MOWER
Filed April 1, 1963
4 Sheets-Sheet 3
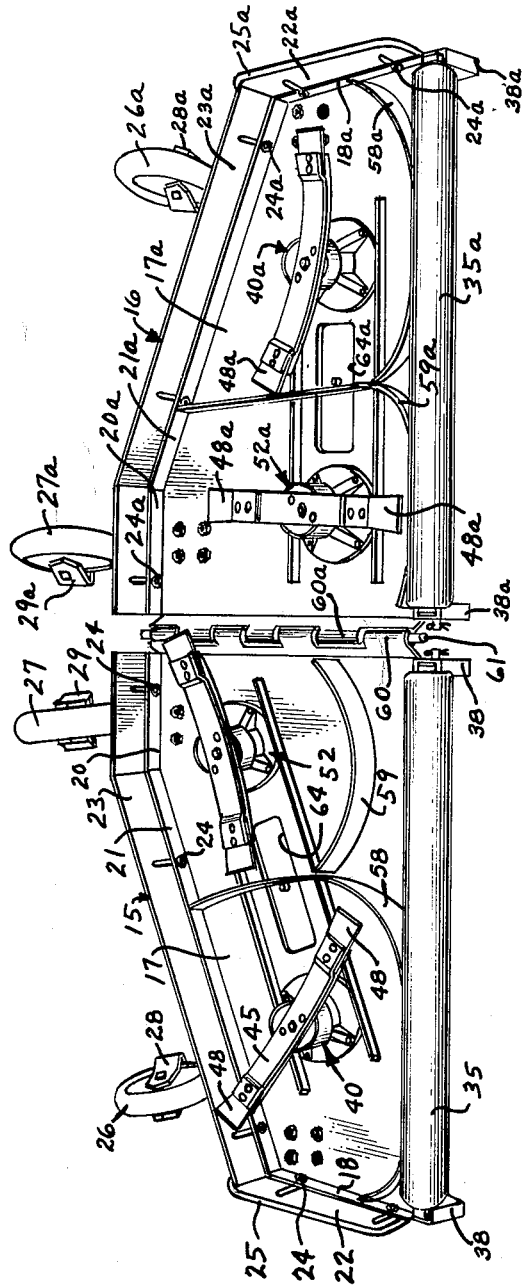
INVENTOR.
MAURICE E. ROBINSON
BY
Donnelly, Mentag & Harrington
ATTORNEYS Jan. 26, 1965
M. E. ROBINSON
3,166,880
MOWER
Filed April 1, 1963
4 Sheets-Sheet 4
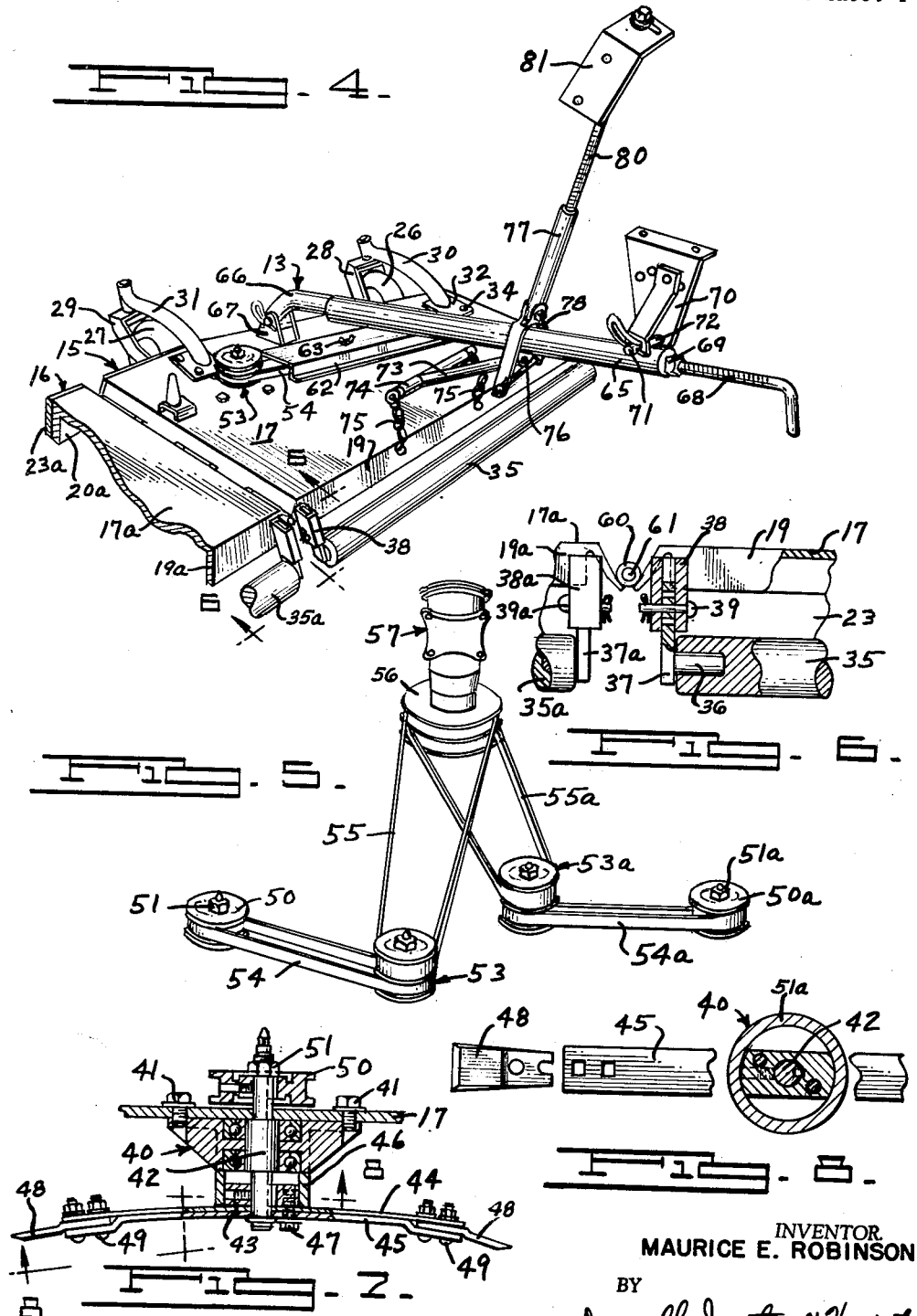
INVENTOR.
MAURICE E. ROBINSON
BY
Donnelly, Mentag & Harrington
ATTORNEYS

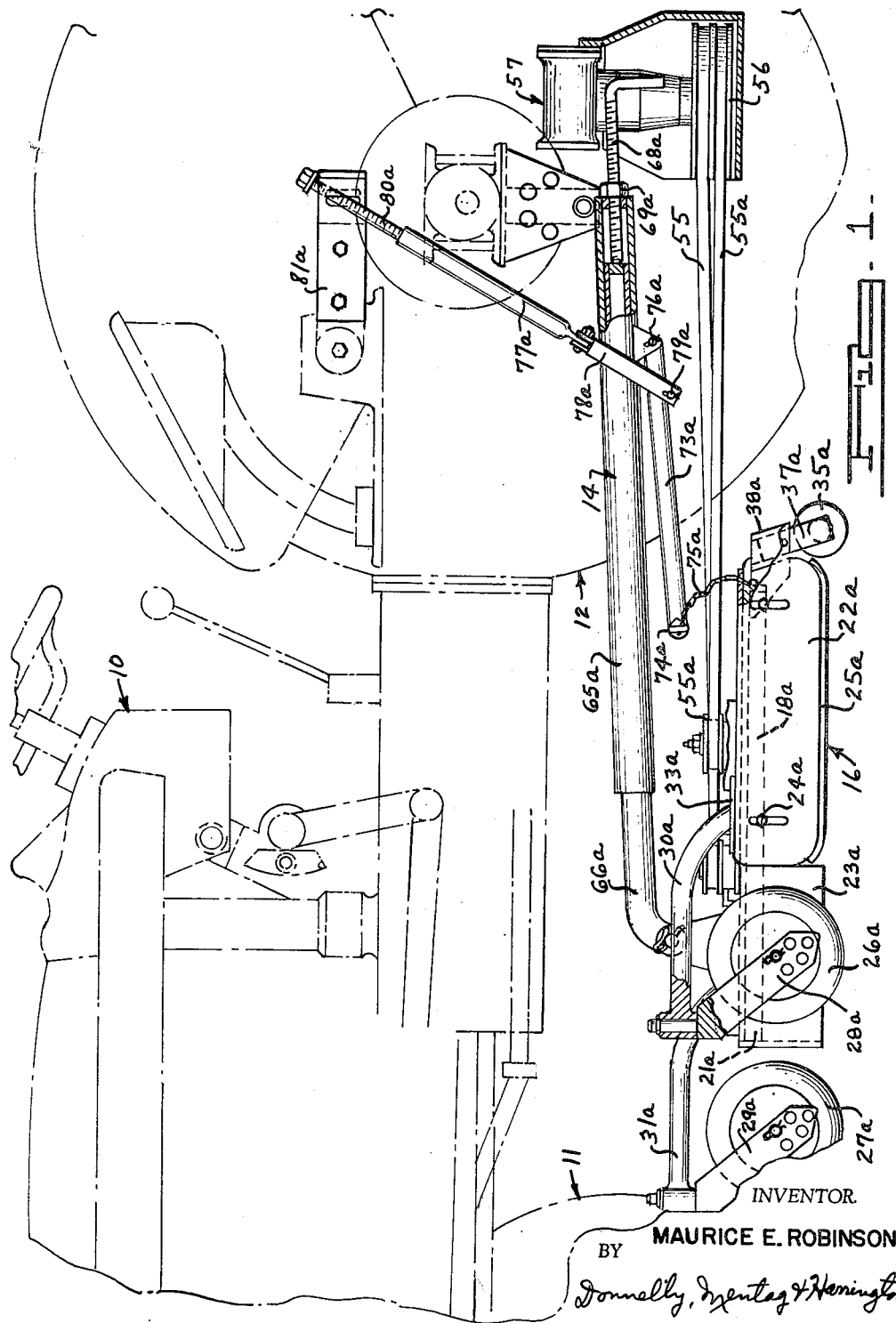

3,166,880
MOWER

Maurice E. Robinson, Livonia, Mich., assignor to Clemar Company, Avon, Ohio, a corporation of Ohio
Filed Apr. 1, 1963, Ser. No. 269,632
11 Claims. (Cl. 56—6)

This invention relates generally to power driven mowers for cutting grass, weeds and the like, and more particularly to a power driven mower of the type which is suspended from a tractor between the forward and rearward wheels thereof.

It is an important object of the present invention to provide a novel and improved power driven mower which includes a main frame, an auxiliary sub-frame and novel means for raising and lowering the sub-frame.

It is another object of the present invention to provide a novel and improved power driven mower of the type adapted to be suspended beneath a tractor between the front and rear wheels thereof and which includes a novel mounting means and lifting structure for mounting the mower sub-frame assembly to a tractor.

It is a further object of the present invention to provide a power driven mower which is adapted to be suspended beneath a conventional tractor between the front and rear wheels thereof and which includes a novel auxiliary sub-frame which functions as a lift apparatus and also includes improved means for adjusting the tension of a belt drive system operated by a conventional power take-off means on the tractor.

It is still another object of the present invention to provide a novel and improved power driven mower of the class described which includes a novel and improved cutter housing and means for adjustably mounting the cutter housing under a tractor between the front and rear wheels thereof.

Other objects, features and advantages of this invention will be apparent from the following detailed description, appended claims, and the accompanying drawings.

In the drawings:

FIG. 1 is a side elevational view, with parts broken away and parts shown in section, of a mower constructed in accordance with the principles of the present invention;

FIG. 2 is an elevational perspective view of the mower illustrated in FIG. 1;

FIG. 3 is a bottom perspective view of the mower structure illutrated in FIG. 2;

FIG. 4 is a fragmentary rear perspective view of the mower structure illustrated in FIG. 1;

FIG. 5 is an elevational, fragmentary view of the belt drive system for operating the cutter blades of the mower;

FIG. 6 is an enlarged fragmentary, elevational view, partly in section, of the structure illustrated in FIG. 4, taken along the line 6—6 thereof and looking in the direction of the arrows;

FIG. 7 is a fragmentary, enlarged elevational sectional view of the structure illustrated in FIG. 2, taken along the line 7—7 thereof and looking in the direction of the arrows; and, FIG. 8 is an enlarged, fragmentary, broken, horizontal sectional view of the structure illustrated in FIG. 7, taken along the line 8—8 thereof and looking in the direction of the arrows.

Referring now to the drawings, and especially to FIGS. 1-3 wherein is shown an illustrative embodiment of a mower made in accordance with the principles of the present invention, the reference numeral 10 generally indicates the main frame which may be in the form of a conventional tractor having the front and rear supporting wheels 11 and 12, respectively. The mower includes an auxiliary frame means indicated generally by the numerals 13 and 14. The auxiliary frame means 13 comprises the right side longitudinally extended lift arm assembly, and the member 14 comprises the left side longitudinally extended lift arm assembly.

A cutter housing is carried by the auxiliary frame and comprises the right housing portion generally indicated by the reference numeral 15 and the left hand housing portion generally indicated by the reference numeral 16.

The right housing portion 15 includes a horizontal top wall or plate 17, and the integral downwardly extended side wall 18, rear wall 19, and front wall formed by the portions 20 and 21. The rear wall 19 is disposed at right angles to the outer side wall 18. The front wall portion 20 is disposed along the inner side of the top wall 17. The front wall portion 21 slants outwardly and rearwardly and joins the front end of the short side wall 18. It will be seen that the top wall 17 is substantially rectangular in shape with the outer front corner removed.

As best seen in FIGS. 2 and 3, the cutter housing portion 15 is provided with the right side guard plate 22 and the front right hand guard plate 23. The vertical guard plates 22 and 23 are adjustably connected to the side wall 18, and the front wall portions 20 and 21 by any suitable means as by the plurality of cap screws 24. The side guard plate 22 is provided on the lower edge thereof with a suitable ground engaging means which may be in the form of skids or runners as indicated by the numeral 25.

The front side of the cutter housing 15 is supported by suitable ground engaging means as the rubber wheels or rollers 26 and 27 which are rollably mounted in the yoke assemblies 28 and 29, respectively. The rollers 26 and 27 are rotatably mounted on vertical shafts carried on the wheel brackets 30 and 31 which are secured to the housing top wall 17 by the attachment plates 32 and 33, respectively. The attachment plates 32 and 33 may be secured to the top wall 17 by any suitable means as by a plurality of bolts 34.

As shown in FIGS. 3, 5 and 6, the rear side of the cutter housing portion 15 is supported by suitable ground engaging means as the wood roller 35 which is rollably carried on each end thereof by a shaft as 36. The shafts 36 are mounted on the lower ends of brackets 37 which are adjustably mounted for vertical adjustment in the tubes 38 by suitable pins as 39.

As shown in FIGS. 2, 3, 7 and 8, the mower is provided with a pair of cutter means in the housing portion 15. One of the cutter means is disposed toward the outer side wall 22 and includes the bearing housing generally indicated by the numeral 40 which is secured to the top wall 17 by means of the cap screws 41. Rotatably mounted in the bearing housing 40 is the spindle shaft 42 and which carries on the lower end thereof the blade carrier holder 43. Fixedly secured to the blade carrier holder 43 by means of the cap screws 47 is a cutter blade carrier assembly comprising a pair of arms or elongated plates 44 and 45 and the tubular member 46. The outer ends of the arms 44 and 45 are spaced apart to receive the cutter blades 48 which are secured to the arms by any suitable means as by the cap screws 49. The spindle shaft 42 extends upwardly through a suitable opening in the plate 17 and has fixed thereon the driven pulley 50 by means of the lock nut means 51.

As shown in FIG. 3, the other or second cutter means in the housing 15 is indicated generally by the numeral 52 and is constructed the same as the aforedescribed cutter means. The drive pulley for the second cutter means is indicated by the numeral 53 and is a double grooved pulley. A conventional V-belt 54 drivably connects the lower groove on the pulley 53 and the pulley 50.

The left portion of the cutter housing is similarly constructed and the corresponding parts have been marked with the same reference numerals followed by the small letter "a." As shown in FIGS. 1 and 5, the upper or second groove on the pulleys 53 and 53a are engaged by the drive belts 55 and 55a, respectively, and these drive belts are driven by the pulley 56. The main drive pulley 56 is mounted on the drive shaft of a conventional stationary gear box generally indicated by the numeral 57. The gear box 57 is mounted on the tractor or main frame 10 and it is driven in the usual manner by a conventional tractor power take-off mechanism.

As shown in FIG. 3, the right cutter housing includes the cutter guards 58 and 59 mounted on the inner side of the top wall 17. These guards are curved in accordance with the travel of the cutter blades. Cutter housing 17a is provided with similar guards 58a and 59a.

The cutter housing portions 17 and 17a are provided with the hinges 60 and 60a along the inner sides thereof and they are hingedly connected by the hinge pin 61. As shown in FIG. 2, the mower is provided with suitable belt covers 62 and 62a which are detachably secured on the top walls of the housing portions by any suitable means as by the wing nut means 63 and 63a. The cutter housing portions 17 and 17a are provided with inspection holes as 64 and 64a, respectively, as shown in FIG. 3.

The lift arm assemblies 13 and 14 are similarly constructed and assembly 13 will be described and the same reference numerals will be applied to the same parts of assembly 14. The lift arm assembly 13 includes the elongated tube or rear portion 65 into the front end of which is telescopically received the extension or front arm portion 66. The front arm portion 66 is hingedly connected to the cutter housing portion 17 by means of the hinge bracket means indicated by the numeral 67. A threaded take-up bolt 68 is threaded through the rear end of the arm portion 65 and abuts the closed rear end of the front arm portion 66 for adjusting the same relative to the rear portion 65 for tightening of the belt 55. A lock nut 69 is provided to lock the bolt 68 in adjusted positions. The tube portions 65 and 66 form what may be termed a front lift arm. The rear end of the arm portion 65 is hinged by the pin 71 to the stabilizer bracket 70 which is secured to the tractor. The pin 71 is rotatably mounted through a sleeve 72 on the arm portion 65.

The rear lift arm comprises a lower portion having the arm 73 to which is fixed the cross piece 74 which is connected at the ends thereof to the rear housing wall 19 by means of a pair of chains as 75. The rear end of the arm 73 is hinged to the lower side of the lift arm 65 at the point 76. The rear lift arm includes the upper portion which comprises the vertical tube 77 on the lower end of which is mounted a yoke 78 having its lower end straddling the lift arm 65 and hinged to it on the lower side as at the point 79. Threaded into the upper end of the tube 77 is the assembly bolt 80 which connects the rear lift arm assembly to the adaptor bracket 81 mounted on the tractor or main frame. It will be seen that when the adjusting bolts 80 and 80a are threaded downwardly into the tubes 77 and 77a, respectively, that the arms 73 and 73a will be moved upwardly about the pivot points 76 so as to lift the rear portion of the cutter housings relative to the ground. Continued inward movement of these screws into said tubes would bring the arms 73 and 73a upwardly to positions to engage the lift-arm assemblies 13 and 14 so as to lift the entire mower housings and cutters above the ground since the rear end of the lift arm assemblies 13 and 14 are pivotally mounted on the tractor housing at the rear ends thereof by means of the pivot pins 71.

In operation, the drive belts 55 and 55a may be quickly and easily tightened by adjusting the bolts 68 and 68a. As the mower moves across the ground, the wheels 26, 27, 26a and 27a follow the contour and raise the front ends of the cutter housing portions 17 and 17a, whereby the cutter blades follow the ground contour. As the cutter housing wheels move upwardly and downwardly the housing portions 17 and 17a pivot about the hinge pin 61. The adjusting bolt 80 permits the operator to adjust the level of the cutter housing rear edge relative to the ground. The rear rollers 35 and 35a are adjusted to control the cutter blade action relative to the ground level.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. A mower comprising, in combination, a main frame; supporting wheels mounted to said main frame; auxiliary frame means pivotally attached to said main frame; a cutter housing hingedly connected to said auxiliary frame; said cutter housing being provided with ground engaging means; said auxiliary frame means including at least a front lift arm assembly and a rear arm assembly; cutter means rotatably mounted on said cutter housing; a power drive means on said main frame; a belt drive means connected between said power drive means and said cutter means for driving the cutter means; said front lift arm assembly including a pair of telescopically connected arm members; and, means for adjusting said telescopically connected arm members to adjust said auxiliary frame means relative to the main frame for tightening said belt drive means.

2. A mower as defined in claim 1, wherein: said cutter housing is formed into a pair of housing portions which are hinged together along the adjacent sides thereof.

3. A mower is defined in claim 1, wherein: said rear arm assembly includes means for raising and lowering the rear portion of the cutter housing.

4. A mower as defined in claim 1, wherein: said cutter housing is provided with roller means on the rear side thereof for adjusting the distance of the cutter means from the ground.

5. A mower as defined in claim 1, wherein: said cutter housing is provided with a plurality of ground engaging rollers on the front side thereof.

6. A mower comprising, in combination, a main frame; supporting wheels mounted to said main frame; auxiliary frame means attached to said main frame; a cutter housing having a right side portion and a left side portion; means hingedly connecting the cutter housing portions together; said auxiliary frame means including a pair of front lift arm assemblies and a pair of rear lift arm assemblies with one of each of said pairs connected to each of said cutter housing portions; each of said front lift arm assemblies including front arm and rear arm portions, the forward end of the front arm portion being hingedly connected to the adjacent cutter housing and the rearward end being telescopically mounted in the forward end of the rear arm portion, and the rear arm portion being hingedly connected to the main frame; cutter means rotatably mounted in each of said cutter housing portions; a power drive means on said main frame; a belt drive means connected between said drive means and said cutter means for driving the cutter means; and, means mounted on each of the rear arm portions of each front lift arm assembly for engaging the front arm portion telescopically received therein for moving the same axially relative to the rear arm portion for tightening said belt drive means.

7. A mower as defined in claim 6, wherein: each of said cutter housing portions has at least one ground engaging roller attached directly thereto on the front side thereof.

8. A mower as defined in claim 6, wherein: said means for tightening said belt drive means includes, a bolt threadably mounted in the rear end of each of the rear arm portions for abutting engagement with the respective front arm portion for moving the same relative to the rear arm portion.

9. A mower as defined in claim 6, wherein: the cutter means in one of the cutter housing portions includes a pair of transversely aligned cutters and the cutter means in the other cutter housing portion includes a pair of cutters disposed in longitudinally offset positions.

10. A mower as defined in claim 6, wherein: each of said rear lift arm assemblies includes a lower arm portion and an upper arm portion, the lower arm portion having one end connected to the cutter housing portion, and the other end pivoted to the adjacent front lift arm assembly, and the upper arm portion having the lower end hingedly connected to the lower arm portion and the upper end fixed to the main frame.

11. A mower as defined in claim 6, wherein: each of said cutter housing portions has an inner part of the front end formed parallel with the rear end and an outer part sloping rearwardly and outwardly and terminating at the outer side thereof.

References Cited by the Examiner
UNITED STATES PATENTS

| | | | |
|---|---|---|---|
| 2,801,510 | 8/57 | Colburn | 56—25.4 |
| 2,928,223 | 3/60 | Danuser | 56—25.4 |
| 2,949,004 | 8/60 | Jones | 56—25.4 |
| 3,063,226 | 11/62 | Pfauser | 56—25.4 |

T. GRAHAM CRAVER, *Primary Examiner.*

RUSSELL R. KINSEY, *Examiner.*